United States Patent
Reddy (10) Patent No.: US 10,284,520 B2
(45) Date of Patent: May 7, 2019

(54) MITIGATION AGAINST DOMAIN NAME SYSTEM (DNS) AMPLIFICATION ATTACK

(71) Applicant: Cisco Technology, Inc., San Jose, CA (US)

(72) Inventor: K. Tirumaleswar Reddy, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 15/422,638

(22) Filed: Feb. 2, 2017

(65) Prior Publication Data
US 2018/0219833 A1    Aug. 2, 2018

(51) Int. Cl.
*H04L 29/06*    (2006.01)
*H04L 29/12*    (2006.01)

(52) U.S. Cl.
CPC ...... *H04L 63/0254* (2013.01); *H04L 61/1511* (2013.01); *H04L 61/6063* (2013.01); *H04L 63/1466* (2013.01)

(58) Field of Classification Search
None
See application file for complete search history.

(56) References Cited

U.S. PATENT DOCUMENTS

| 6,108,330 | A * | 8/2000 | Bhatia | H04L 12/2856 370/352 |
| 8,228,861 | B1 * | 7/2012 | Nix | H04W 36/00 370/329 |
| 9,817,730 | B1 * | 11/2017 | Howard | G06F 11/1474 |
| 10,044,620 | B2 * | 8/2018 | Dillon | H04L 47/12 |
| 2003/0093563 | A1 * | 5/2003 | Young | H04L 12/4633 709/245 |
| 2005/0251861 | A1 * | 11/2005 | Cunningham | H04L 63/0428 726/23 |

(Continued)

OTHER PUBLICATIONS

Cheung, Steven; Levitt, Karl N. A Formal-Specification Based Approach for Protecting the Domain Name System. Proceeding International Conference on Dependable Systems and Networks. DSN 2000. https://ieeexplore.ieee.org/stamp/stamp.jsp?tp=&arnumber=857602 (Year: 2000).*

(Continued)

*Primary Examiner* — Jeremiah L Avery
(74) *Attorney, Agent, or Firm* — Edell, Shapiro & Finnan, LLC (57) ABSTRACT

Presented herein are techniques for mitigating a domain name system (DNS) amplification attack. A methodology is provided including receiving, at a (DNS) server, a DNS request, determining whether the DNS request has a source IP address that matches a predetermined source IP address and a port number that falls within a predetermined port range. When the DNS request has a source IP address that matches the predetermined source IP address and a port number that falls within the predetermined port range, determining whether the DNS request includes validation information. Based on the presence or content of the validation information, determining whether the DNS request is a valid DNS request, and dropping the DNS request when it is determined that the DNS request is not a valid DNS request.

20 Claims, 5 Drawing Sheets

(56) References Cited

U.S. PATENT DOCUMENTS

| | | | | |
|---|---|---|---|---|
| 2006/0236370 | A1* | 10/2006 | John | H04L 63/102 726/1 |
| 2011/0277026 | A1* | 11/2011 | Agarwal | G06F 21/41 726/8 |
| 2012/0255022 | A1* | 10/2012 | Ocepek | G06F 21/552 726/25 |
| 2014/0201838 | A1* | 7/2014 | Varsanyi | G06F 21/552 726/23 |
| 2015/0229609 | A1* | 8/2015 | Chien | H04L 63/101 726/13 |
| 2017/0063929 | A1* | 3/2017 | Burbridge | H04L 61/1511 |

OTHER PUBLICATIONS

Yan, Zhihui et al. SAVI-based IPv6 source address validation implementation of the access network. 2011 International Conference on Computer Science and Service System (CSSS). https://ieeexplore.ieee.org/stamp/stamp.jsp?tp=&arnumber=5974125 (Year: 2011).*

Lu, Zhaohui; Liu, Jianing. Design and Implementation of Dynamic Domain Name System Based on BIND. 2009 International Symposium on Computer Network and Multimedia Technology. https://ieeexplore.ieee.org/stamp/stamp.jsp?tp=&arnumber=5374550 (Year: 2009).*

"Akamai's [State of the Internet] Security", Q4 2015 Report, vol. 2, No. 4, Feb. 2016, pp. 1-25.

"Akamai's [State of the Internet] Security", Q4 2015 Report, vol. 2, No. 4, Feb. 2016, pp. 26-56.

"Ransom Attacks: To Believe or Not to Believe", security.radware.com, aboutseader?url=https://security.radware.com/ddos-threats-attacks/threat . . . , last accessed on Jan. 31, 2017, 5 pages.

T. Reddy, et al., "DNS over DTLA (DNSoD)" draft-ietf-dprive-dnsodtls-06, Internet-Draft, Apr. 4, 2016, 11 pages.

"Security Configuration Guide: Cisco Umbrella Branch", http://www.cisco.com/c/en/us/td/docs/ios-xml/ios/sec_data_utd/conf . . . , Updated Aug. 8, 2016, 3 pages.

David Cornell, "DNS Amplification Attacks", Cisco Umbrella, OpenDNS Umbrella Blog, Mar. 17, 2014, https://blog.opendns.com/2014/03/17/dns-amplification-attacks/, 5 pages.

* cited by examiner

MITIGATION AGAINST DOMAIN NAME SYSTEM (DNS) AMPLIFICATION ATTACK

TECHNICAL FIELD

The present disclosure relates to mitigating domain name system (DNS) amplification and related replay attacks.

BACKGROUND

A domain name system (DNS) server is employed to, among other things, resolve a fully quantified domain name (FQDN) to an Internet Protocol (IP) address. For example, a browser application running on a host computer might receive input from a user in the form of selecting a link on a webpage. The link is associated with content that is desired to be accessed by the user, but the content might be stored on a remote server. In order for the browser to obtain the content from the remote server, the browser must first obtain an IP address of the remote server. In this regard, a DNS server is configured to resolve a given FQDN provided in a DNS request, sent by the browser, to a predefined IP address. The IP address is returned by the DNS server in a DNS response. DNS servers are often operated such that most anyone can gain access to the content provider by domain name resolution.

Unfortunately, such open access has enabled hackers and other malicious actors to stage attacks by exploiting the functionality of a DNS server. One such attack is known as an amplification attack. An amplification attack is a form of a denial of service attack, wherein an attacker uses open internet services such as a DNS server to increase the amount of bandwidth sent to a victim and overwhelm its capacity. This is accomplished by spoofing a victim's source IP address and sending, with that spoofed IP address, multiple DNS requests (each comprising tens of bytes) to one or more DNS servers, which will in turn generate and send DNS responses (each comprising thousands of bytes) to the targeted victim. In other words, the relatively small requests result in very large (or amplified) responses. Such attacks are undesirable.

DESCRIPTION OF EXAMPLE EMBODIMENTS

Overview

In one embodiment a methodology is provided including receiving, at a domain name system (DNS) server, a DNS request, determining whether the DNS request has a source IP address that matches a predetermined source IP address and a port number that falls within a predetermined port range. When the DNS request has a source IP address that matches the predetermined source IP address and a port number that falls within the predetermined port range, determining whether the DNS request includes validation information. Based on the presence or content of the validation information, it is determined whether the DNS request is a valid DNS request, and the DNS request is dropped when it is determined that the DNS request is not a valid DNS request.

In another embodiment, a device is provided. The device, such as a DNS server, includes an interface unit configured to enable network communications, a memory, and one or more processors coupled to the interface unit and the memory, and configured to: receive a domain name system (DNS) request, determine whether the DNS request has a source IP address that matches a predetermined source IP address and a port number that falls within a predetermined port range, when the DNS request has a source IP address that matches the predetermined source IP address and a port number that falls within the predetermined port range, determine whether the DNS request includes validation information, based on the validation information, determine whether the DNS request is a valid DNS request, and drop the DNS request when it determined that the DNS request is not a valid DNS request.

In yet another embodiment, a method, performed, for example, by a router within an (enterprise) network, is provided, and includes sending a public Internet Protocol (IP) address and port range that is assigned to the network to a domain name system (DNS) server, receiving a DNS request from a client device within the network; adding validation information to the DNS request, wherein the validation information includes at least a counter; and sending the DNS request, including the validation information, to the DNS server, wherein the DNS request has the public IP address and a port number within the port range that is assigned to the network.

EXAMPLE EMBODIMENTS

Figure 1:
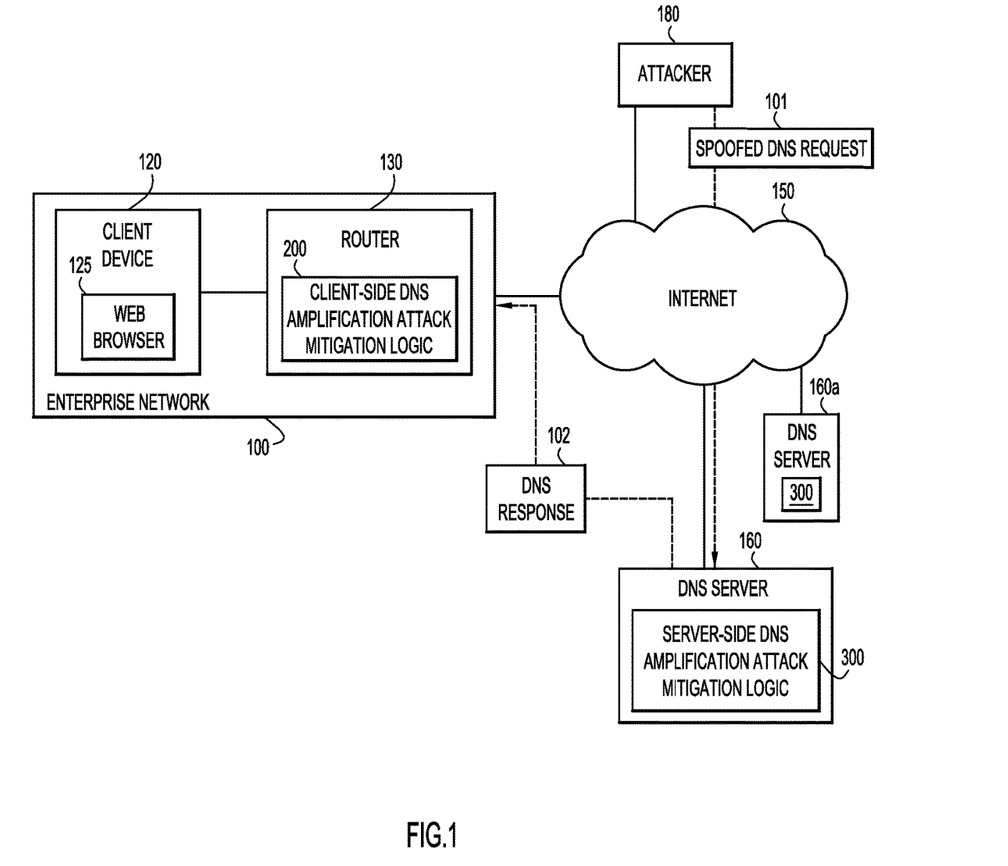
FIG. 1 depicts an electronic communications network in which DNS amplification attack mitigation logic may be deployed in accordance with an example embodiment.

FIG. 1 depicts an electronic communications network in which DNS amplification attack mitigation logic may be deployed in accordance with an example embodiment. As shown, an enterprise network 100 comprises a client device 120, such as a personal computer, laptop computer, tablet, mobile phone, etc., that includes a web browser 125. Web browser 125 is configured to, e.g., retrieve, present, and traverse information resources on the World Wide Web. An information resource may be, e.g., a Uniform Resource Identifier/Locator (URI/URL) or fully qualified domain name (FQDN) and may be a web page, image, video or other piece of content. Hyperlinks present in resources enable users to easily navigate their browsers to related resources. Browser 125 is primarily intended to use the World Wide Web, but it can also be used to access information provided by web servers in private networks or files in file systems.

As further shown, web browser 125 is in communication with router 130 via client device 120. As will be explained in more detail below, router 130 hosts client-side DNS amplification attack mitigation logic 200 that is employed to facilitate identification of legitimate DNS requests by a DNS server. Router 130 is in communication with a network such as the Internet 150. DNS servers 160, 160a are also in communication with Internet 150 and, in an embodiment, host server-side DNS amplification attack mitigation logic 300, which is likewise employed to facilitate identification of legitimate DNS requests.

Also shown in FIG. 1 is an attacker 180. As noted previously, attacker 180 may send a DNS request 101 toward DNS server 160. DNS request 101 may spoof the source IP address of client device 120 and, as a result, DNS server 160 may send a DNS response 102 towards client device 120, even though client device 120 never made the DNS request in the first place. As also noted previously, a DNS response may comprise thousands of bytes thereby consuming bandwidth and processing power at client device 120. One approach to staging such an amplification attack is what is known as a "replay attack." In a replay attack, attacker 180 will obtain a copy of a legitimate DNS request sent by client device 120, and then copy and resend that DNS request to DNS server 160 multiple times, thereby mounting an amplification attack.

As will be explained more fully below, client-side DNS amplification attack mitigation logic 200 and server-side DNS amplification attack mitigation logic 300 work together to confirm that a given DNS request received at DNS server 160 is, in fact, from the enterprise network 100, and is not part of a DNS amplification attack. In this way, amplification attacks, even those staged via a replay attack, can be significantly mitigated, if not fully eliminated.

Figure 2:
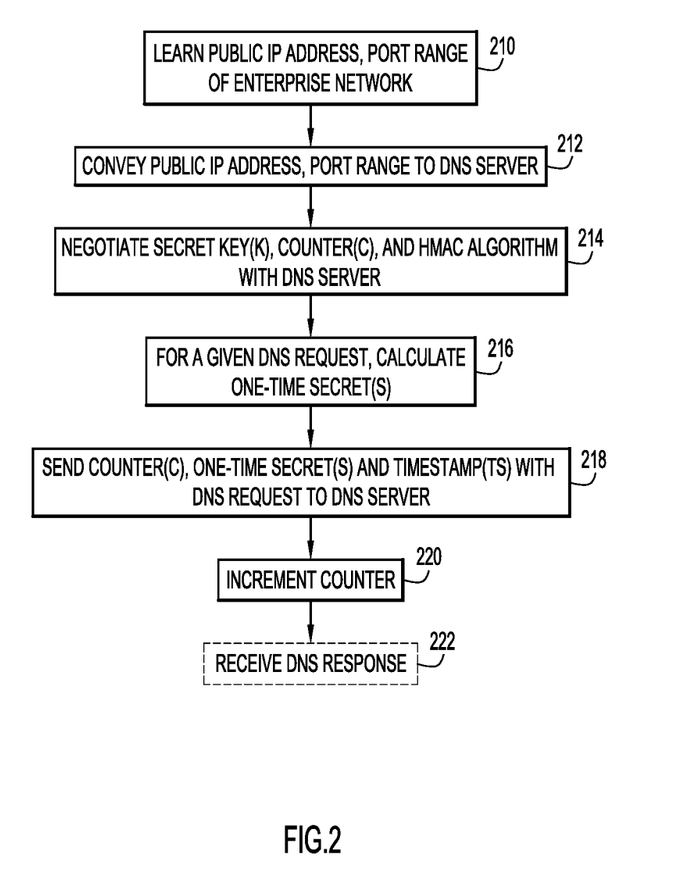
FIG. 2 is a flow chart depicting a series of operations for performing DNS amplification attack mitigation on a client-side or within an enterprise network in accordance with an example embodiment.

FIG. 2 is a flow chart depicting a series of operations for performing DNS amplification attack mitigation on a client-side or within an enterprise network in accordance with an example embodiment. In this embodiment client-side DNS amplification attack mitigation logic 200 is hosted by router 130. At 210, client-side DNS amplification attack mitigation logic 200 learns the public IP address and port range of enterprise network 100. As those skilled in the art appreciate, enterprise network 100 might not have an exclusive IP address. For example, a carrier grade network address translator (CGN) (not shown) may be implemented and which is responsible for managing address space for enterprise network 100. The public IP address and port range, assigned by the CGN, uniquely identifies enterprise network 100, and client-side DNS amplification attack mitigation logic 200 is configured to obtain that information.

At 212, client-side DNS amplification attack mitigation logic 200 conveys the learned public IP address and port range to DNS server 160, and particularly to server-side DNS amplification attack mitigation logic 300.

At 214, client-side DNS amplification attack mitigation logic 200 and server-side DNS amplification attack mitigation logic 300 negotiate, e.g., a secret key (K), key identifier (kid), a counter (C) and a hash message authentication code (HMAC) algorithm, such as HMAC-SHA-2. Negotiation may be by way of a representational state transfer (REST) application programming interface (API). The key identifier (kid) may be used to match a specific secret key (K) in the event a given key is timed out. Counter (C), as will become more clear from the discussion below, is maintained not only on the client-side, but also, separately by the server side, so that a comparison of a given counter value at a given time can be performed by the server side while monitoring for legitimate DNS requests.

At 216, for a given DNS request, a one-time secret (S) is calculated. In one implementation, secret (S)=Truncate (HMAC-SHA-2(K, C||TS)). Internet Engineering Task Force (IETF) RFC 4226, section-5.2 explains this particular one-time secret calculation. Those skilled in the art will appreciate that other forms on one-time secrets could also be implemented. "TS" stands for a current timestamp (e.g., Unix time).

At 218, client-side DNS amplification attack mitigation logic 200 sends the counter (C), calculated one-time secret (S) and timestamp (TS) along with the DNS request to DNS server 160 and server-side DNS amplification attack mitigation logic 300 hosted thereby. In one implementation, this additional or validation information is sent in an extended DNS (EDNS) option field.

At 220, the counter (C) is incremented. Separately, at 222, a DNS response is received, but only after the DNS request is successfully vetted by server-side DNS amplification attack mitigation logic 300, as will be explained next. Generally speaking, a DNS request legitimately sent by client 120 via client-side DNS amplification attack mitigation logic 200 will result in the receipt of a corresponding DNS response at 222. As will be seen below, the additional or validation information sent along with the DNS request enables server-side DNS amplification attack mitigation logic 300 to distinguish between legitimate DNS requests and those that may be part of an attacker's amplification attack/replay attack. DNS requests deemed not to be legitimate are dropped and a DNS response to such dropped DNS requests are thus never generated for/sent to the client device 120, saving bandwidth and processing power.

Figure 3:
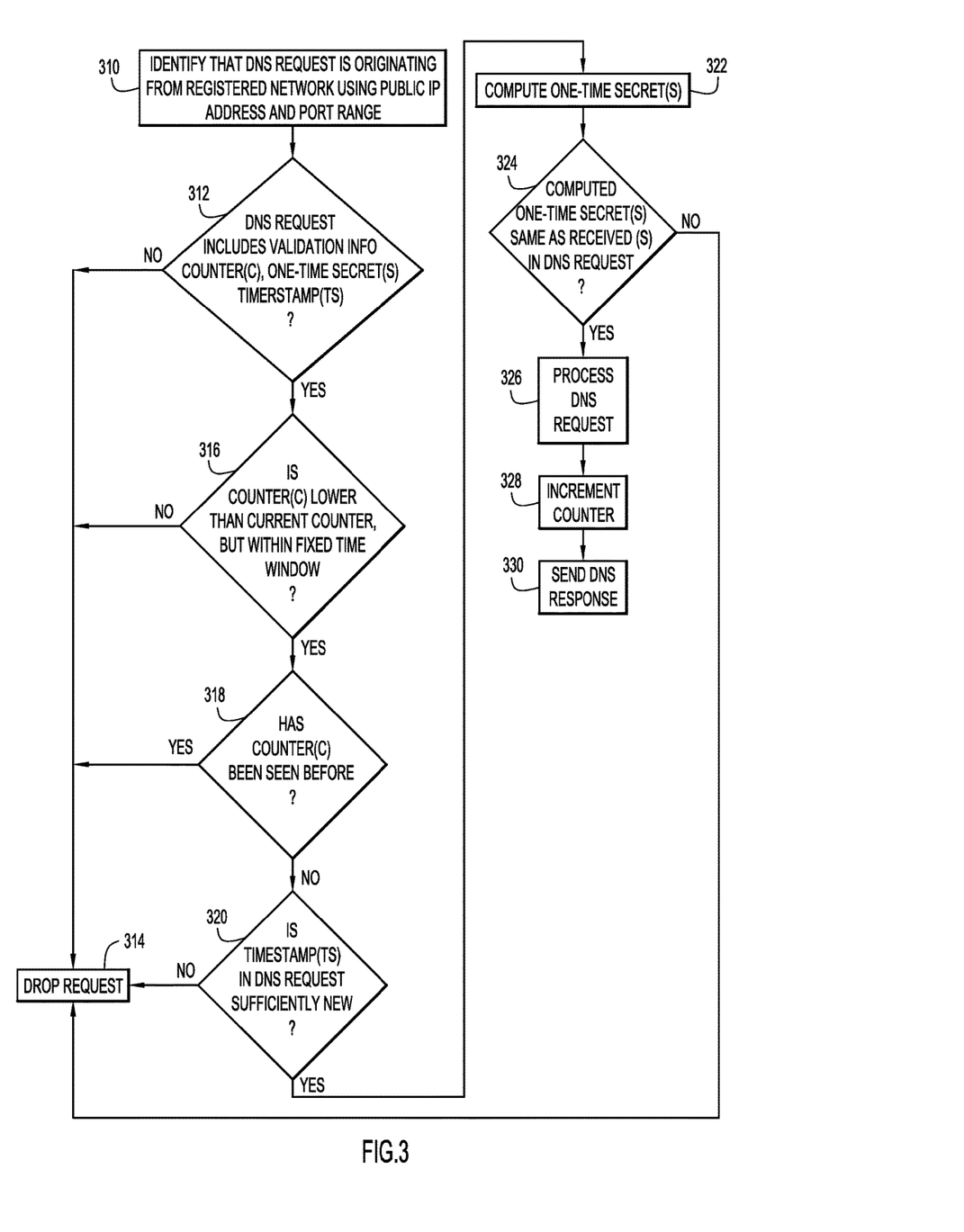
FIG. 3 is a flow chart depicting a series of operations for performing DNS amplification attack mitigation at a DNS server in accordance with an example embodiment.

FIG. 3 is a flow chart depicting a series of operations for performing DNS amplification attack mitigation at a DNS server 160 in accordance with an example embodiment. At 310, server-side DNS amplification attack mitigation logic 300 is configured to identify that a DNS request received at DNS server 160 originated from a registered enterprise network by inspecting the public IP address and port number of the received DNS request, and comparing the same to public IP addresses and port range of enterprise networks being served by the DNS amplification attack mitigation techniques described herein. That is, server-side DNS amplification attack mitigation logic 300 compares the public IP address and port number of an incoming DNS request with the public IP addresses and port range of any enterprise network that sent such information in operation 212 of FIG. 2.

If there is no match, then the DNS request will not be subjected to the methodology further described herein, and may be processed in the conventional fashion by DNS server 160.

At 312, it is determined whether the received DNS request includes the expected validation information including, e.g., the counter (C), one-time secret (S) and timestamp (TS). If the DNS request does not include the validation information, the DNS request is dropped. That is, assuming the DNS request is purported to be coming from a registered network in view of its public IP address and port range, the expected validation information in, e.g., an extended DNS field, should be included. If the validation information is not included, then the DNS request is considered to not be a legitimate DSN request from the registered network, e.g., enterprise network 100, and may instead be considered to be part of a DNS amplification attack, but wherein the attacker may be unfamiliar with the expected inclusion of the validation information. Thus, when the validation information of, e.g., the counter (C), one-time secret (S) and timestamp (TS) is not included, the DNS request, even though purported to be from a registered enterprise network, is dropped at 314.

If the validation information is found to be included in the DNS request, then the individual values of the validation information are checked to further confirm that the DNS request is a legitimate request, and not, e.g., a replay attack. Specifically, at 316, it is determined whether the value of counter (C) is lower than the value of the counter maintained by server-side DNS amplification attack mitigation logic 300, but within a fixed time window. That is, if the counter value included with the DNS request is lower than the counter value maintained by server-side DNS amplification attack mitigation logic 300, such a scenario suggests the DNS request is part of a replay attack in that, perhaps, an attacker has copied a prior DNS request and simply resent it. Such a copied DNS request would have a lower counter value since the DNS request is a prior/original DNS request. In the meantime, the counter value maintained by server-side DNS amplification attack mitigation logic 300 might have been incremented multiple times since the original copied DNS request was received.

An exception is provided by way of a fixed time window. That is, it is possible that a given DNS request is simply delayed in the Internet 150 and is therefore received by server-side DNS amplification attack mitigation logic 300 after a newer DNS request, with a higher counter value, is received. As such, a later received DNS request might have been sent earlier. In other words, it is possible for DNS requests to be received out of order. Consequently, the counter value in the DNS request might not perfectly match the counter value maintained by server-side DNS amplification attack mitigation logic 300. In this regard, if the counter value is lower than what might be expected, but the DNS request has been received within a fixed time window (e.g., 1 second, 10 seconds, 1 minute, etc.) from the DNS request with a higher counter value, then the DNS request with the lower counter value might still be further processed. If not, the DNS request is dropped at 314.

If further processing is indicated by 316, then at 318 it is determined whether the very same counter value has been seen before by the server-side DNS amplification attack mitigation logic 300. If the counter value has been seen before, the DNS request is almost certainly part of a replay attack, and the DNS request is dropped at 314.

At 320, it is determined whether the timestamp (TS) included with the DNS request is sufficiently new to be considered a legitimate DNS request. A much older timestamp (TS), e.g., older than 1 second, 10 seconds, 1 minute, etc., suggests a replay attack, and the DNS request is accordingly dropped at 314. More specifically, when a DNS request is received from a registered network for the first time, the received timestamp, TSnew, conveyed in the extended DNS field is checked, and the DNS request is further processed if the timestamp is recent enough to the reception time of the DNS Request, RDnew:

$$-\text{Delta} < (RD\text{new} - TS\text{new}) < +\text{Delta},$$

where TSnew is the received timestamp.

For subsequent DNS requests from the registered network, the timestamp is checked against the previously received DNS request:

$$TS\text{new} + \text{fuzz} > TS\text{last} + (RD\text{new} - RD\text{last}) \times (1 - \text{drift}) - \text{fuzz},$$

where TSlast is the timestamp in the last received and accepted DNS request from the registered network, and RDlast is the receive time of the last received and accepted DNS request from the registered network. The above formulas, and default values for the indicated delta, drift and fuzz variables are discussed in IETF RFC 3971 and for brevity will not be discussed further herein.

If the above inequality does not hold, the server-side DNS amplification attack mitigation logic 300 drops the DNS request at 314. If, on the other hand, the inequality holds, the Server-side DNS amplification attack mitigation logic 300 further processes the DNS request.

That is, if the timestamp (TS) is considered sufficiently new at 320, then at 322 server-side DNS amplification attack mitigation logic 300 computes its own version of the one-time secret, using among other values, the secret key (K) and HMAC algorithm previously negotiated. Then, at 324, it is determined whether the computed one-time secret is the same as the one-time secret received as part of the additional or validation information received in the extended DNS request field. If the one-time secrets do not match, then the DNS request is dropped at 314.

If the one-time secrets do match at 324, then at 326, the DNS request is processed and an IP address associated with the FQDN contained in the DNS request is identified. At 328, the counter maintained by server-side DNS amplification attack mitigation logic 300 is incremented. Incrementing may be limited to the scenario where TSnew>TSlast. Server-side DNS amplification attack mitigation logic 300 may then update RDlast and TSlast.

At 330, a DNS response, containing the IP address associated with the FQDN contained in the DNS request, is sent to client device 120.

Thus, as will be appreciated by those skilled in the art, the methodology described herein protects a registered enterprise network and client devices hosted by that enterprise network from DNS amplification and, related DNS replay, attacks by confirming that a given DNS request is actually received from an entity that operates client-side DNS amplification attack mitigation logic 200 and includes appropriate additional information in the form of, e.g., a counter value (C), a one-time secret (S) and a timestamp (TS), each of which can be used to verify the legitimacy of the DNS request.

In one implementation, DNS server 160 uses anycast addresses so the registered network 100 may communicate with a nearest DNS server 160 or 160a thus enabling seamless failover to a different DNS server. In accordance with the embodiments described herein, even if attacker 180 passively monitors DNS traffic between the router 130 and a given DNS sever 160, and replays the traffic to the same DNS server to which the registered network is sending DNS requests, or to a different DNS server 160a, counter (C) and timestamp validation procedures discussed above provides protection against such relay attacks, since at least timing (and perhaps also counter values) may be shared among the DNS servers.

For still further security, encryption may be implemented between router 130 and a DNS server 160. Such encryption protects against a brute force attack that attempts to guess the secret key (K). DNSCrypt is one possible option for encrypting the DNS traffic between, e.g., router 130 and a given DNS server.

In accordance with another possible implementation, a given DNS request and corresponding DNS response could also be verified using a message integrity protection mechanism using, e.g., the secret key (K), so that, for example, it is more difficult to capture and replay a given DNS request and a DNS response being returned for a request for an IP address for a legitimate website, is not effectively "hijacked" to include an IP address for a malware site.

The embodiments described herein can be further extended to generate message integrity for the entire message when, e.g., when DNSCrypt is not used. However, when DNSCrypt is used, generating message integrity for the entire message may not provide much added protection since, the counter (C), time-stamp (TS) and one-time secret (S) already ensure a given DNS request is not sent from an attacker and provides protection against replay attacks and, moreover, DNSCrypt already provides encryption and message integrity for DNS messages.

Figure 4:
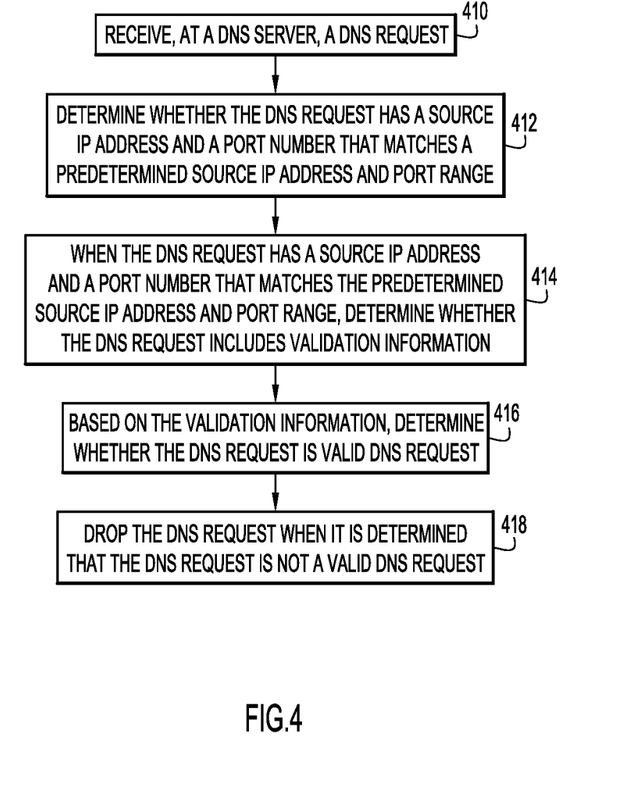
FIG. 4 is a flow chart depicting a series of operation for DNS amplification attack mitigation in accordance with another example embodiment.
Figure 5:
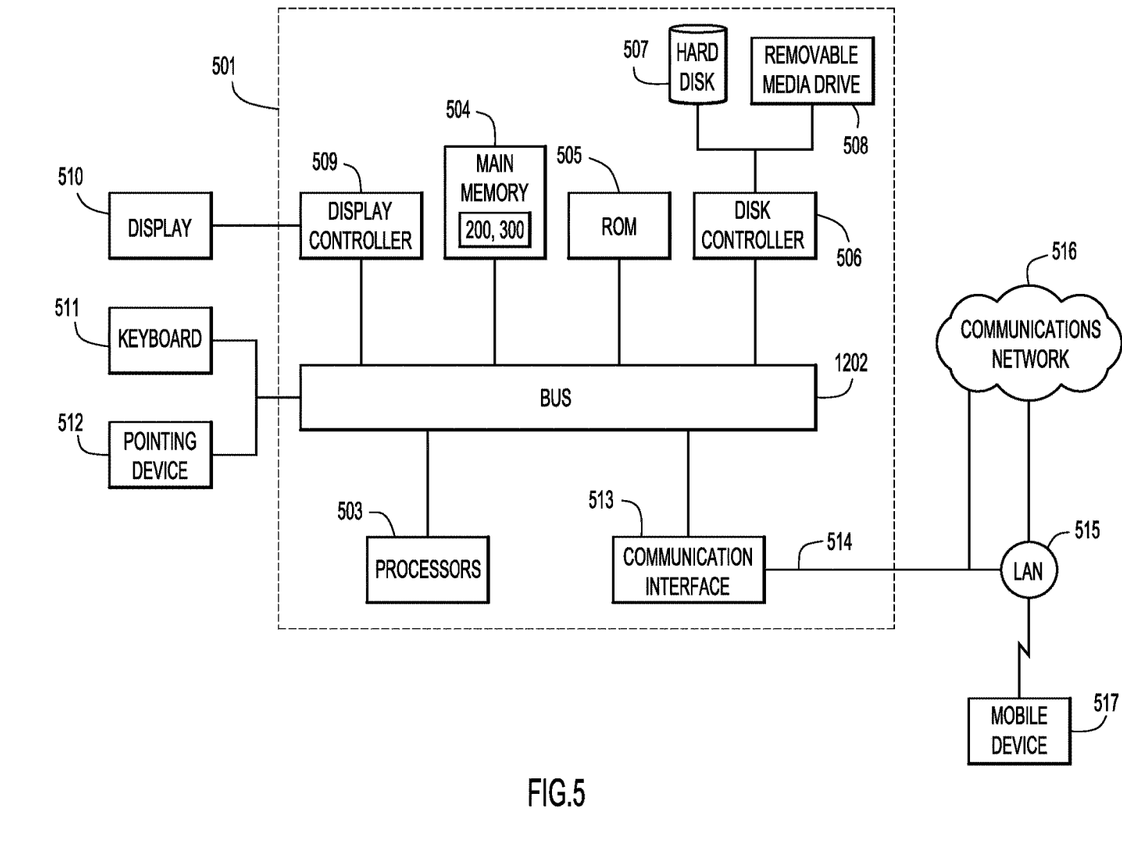
FIG. 5 is a block diagram of a device (e.g., a router or server device) on which the several described embodiments may be implemented.

FIG. 4 is a flow chart depicting a series of operation for DNS amplification attack mitigation in accordance with another example embodiment. At 410, a domain name system (DNS) server receives a DNS request. At 412, the DNS server determines whether the DNS request has a source IP address that matches a predetermined source IP address (e.g., the public IP address) and a port number that falls within a predetermined port range (a port range of the registered network sent by client-side DNS amplification attack mitigation logic 200). At 414, when the DNS request has a source IP address and a port number that matches/falls within a predetermined source IP address and port range, the DNS server determines whether the DNS request includes validation information. At 416, based on the validation information, the DNS server determines whether the DNS request is a valid DNS request. At 418, the DNS server drops the DNS request when it is determined that the DNS request is not a valid DNS request FIG. 5 depicts an apparatus on which the several described embodiments may be implemented. The apparatus, e.g., router 130 or DNS server 160 may be implemented on or as a computer system 501. The computer system 501 may be programmed to implement a computer based device. The computer system 501 includes a bus 502 or other communication mechanism for communicating information, and a processor 503 coupled with the bus 502 for processing the information. While the figure shows a single block 503 for a processor, it should be understood that the processor 503 represents a plurality of processors or processing cores, each of which can perform separate processing. The computer system 501 may also include a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions (e.g., the logic 200, 300 to perform the operations of FIGS. 2-4 described throughout) to be executed by processor 503. In addition, the main memory 504 may be used for storing temporary variables or other intermediate information during the execution of instructions by the processor 503.

The computer system 501 may further include a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 may also include a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a cathode ray tube (CRT) or liquid crystal display (LCD), light emitting diode (LED) display, for displaying information to a computer user. The computer system 501 may include input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing operations of the embodiments described herein in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the described embodiments, and for enabling the computer system 501 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516. For example, the communication interface 513 may be a wired or wireless network interface card or modem (e.g., with SIM card) configured to attach to any packet switched (wired or wireless) LAN or WWAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection to a mobile device 517 such as a personal digital assistant (PDA) laptop computer, cellular telephone, or modem and SIM card integrated with a given device.

In sum, there is provided a methodology including operations of receiving, at a domain name system (DNS) server, a DNS request; determining whether the DNS request has a source IP address and a port number that matches a predetermined source IP address and port range; when the DNS request has a source IP address and a port number that matches a predetermined source IP address and port range, determining whether the DNS request includes validation information; based on the validation information, determining whether the DNS request is a valid DNS request; and dropping the DNS request when it is determined that the DNS request is not a valid DNS request.

The methodology may further include receiving from a network that is to become a registered network with the DNS server, the predetermined public IP address and port range.

In accordance with one implementation, the validation information may include at least one of a counter value, a key identifier, a first one-time secret, and a timestamp.

The methodology may further include determining whether the counter value included with the validation information is lower than a counter value maintained by the DNS server; and dropping the DNS request if the counter value included with the validation information is lower than the counter value maintained by the DNS server.

The methodology may still further include determining whether the counter value included with the validation information is the same as a counter value maintained by the DNS server or is the same as a counter value previously seen by the DNS server; and dropping the DNS request if the counter value included with the validation information is the same as the counter value maintained by the DNS server or is the same as a counter value previously seen by the DNS server.

The methodology may still further include determining whether the timestamp included with the validation information is older than a current time value maintained by the DNS server; and dropping the DNS request if the timestamp included with the validation information is older than the current time value maintained by the DNS server.

The methodology may still further include calculating a second one-time secret based on the counter value, the timestamp and a key value, wherein the key value was previously negotiated with a network before receiving the DNS request; comparing the first one-time secret in the DNS request with the second one-time secret; and dropping the DNS request when the first one-time secret and the second one-time secret do not match.

In one implementation, the validation information may be received in an option field of an extended DNS request.

The DNS request may be received from a router that is configured to add the validation information to the DNS request.

The methodology may still further include receiving a second DNS request; determining whether the second DNS request has a source IP address and a port number that matches the predetermined source IP address and port range; when the second DNS request has a source IP address and a port number that matches a predetermined source IP address and port range, determining whether the second DNS request includes second validation information; based on the second validation information, determining whether the DNS request is a valid DNS request; and processing the second DNS request including sending a DNS response to the source IP address and the port number of the second DNS request.

In one implementation the second DNS request and the DNS response are integrity protected using a key value, wherein the key value was previously negotiated with a network.

There is further provided an apparatus that includes an interface unit configured to enable network communications; a memory; and one or more processors coupled to the interface unit and the memory, and configured to: receive server, a domain name system (DNS) request; determine whether the DNS request has a source IP address and a port number that matches a predetermined source IP address and port range; when the DNS request has a source IP address and a port number that matches a predetermined source IP address and port range, determine whether the DNS request includes validation information; based on the validation information, determine whether the DNS request is a valid DNS request; and drop the DNS request when it determined that the DNS request is not a valid DNS request.

The one or more processors may be further configured to: receive from a network that is to become a registered network with the device, the predetermined public IP address and port range.

The validation information may include at least one of a counter value, a key identifier, a first one-time secret, and a timestamp.

The one or more processors may be further configured to: determine whether the counter value included with the validation information is lower than a counter value maintained by the device; and drop the DNS request if the counter value included with the validation information is lower than the counter value maintained by the device.

The one or more processors may be further configured to: determine whether the counter value included with the validation information is the same as a counter value maintained by the device or the same as a counter value previously seen by the device; and drop the DNS request if the counter value included with the validation information is the same as the counter value maintained by the device or the same as a counter value previously seen by the device.

The one or more processors may be further configured to: determine whether the timestamp included with the validation information is older than a current time value maintained by the device; and drop the DNS request if the timestamp included with the validation information is older than the current time value maintained by the device.

In yet another embodiment, a methodology is provided including sending a public Internet Protocol (IP) address and port range that is assigned to a network to a domain name system (DNS) server; receiving a DNS request from a client device within the network; adding validation information to the DNS request, wherein the validation information includes a counter; and sending the DNS request, including the validation information, to the DNS server, wherein the DNS request has the public IP address and a port number within the port range that is assigned to the network.

The validation information may further include a one-time secret, a key identifier, a counter, a key identifier and a timestamp.

In an implementation, adding validation information to the DNS request comprises adding the validation information in an option field of an extended DNS request.

The aforementioned methodologies may be embodied in processor executable instructions encoded in one or more processor readable media, as well as in a device/apparatus.

The above description is intended by way of example only. Various modifications and structural changes may be made therein without departing from the scope of the concepts described herein and within the scope and range of equivalents of the claims.

What is claimed is:

1. A method comprising:
   receiving, at a domain name system (DNS) server, a DNS request;
   determining whether the DNS request has a source IP address that matches a predetermined source IP address and a port number that falls within a predetermined port range;
   when the DNS request has a source IP address that matches the predetermined source IP address and a port number that falls within a predetermined port range, determining whether the DNS request includes validation information other than the source IP address and the port number;
   based on the validation information, determining whether the DNS request is a valid DNS request; and
   dropping the DNS request when it is determined that the DNS request is not a valid DNS request.

2. The method of claim 1, further comprising, receiving from a network that is to become a registered network with the DNS server, a predetermined public IP address as the source IP address, and the predetermined port range.

3. The method of claim 1, wherein the validation information includes at least one of a counter value, a first one-time secret, and a timestamp.

4. The method of claim 3, further comprising:
   determining whether the counter value included with the validation information is lower less than a counter value maintained by the DNS server; and
   dropping the DNS request if the counter value included with the validation information is lower less than the counter value maintained by the DNS server.

5. The method of claim 3, further comprising:
   determining whether the counter value included with the validation information is the same as a counter value maintained by the DNS server or is the same as a counter value previously seen by the DNS server; and
   dropping the DNS request if the counter value included with the validation information is the same as the counter value maintained by the DNS server or is the same as a counter value previously seen by the DNS server.

6. The method of claim 3, further comprising:
   determining whether a time value of the timestamp included with the validation information is before a current time value maintained by the DNS server; and
   dropping the DNS request if the time value of the timestamp included with the validation information is before the current time value maintained by the DNS server.

7. The method of claim 3, further comprising:
   calculating a second one-time secret based on the counter value, the timestamp and a key value, wherein the key value was previously negotiated with a network before receiving the DNS request;
   comparing the first one-time secret in the DNS request with the second one-time secret; and
   dropping the DNS request when the first one-time secret and the second one-time secret do not match.

8. The method of claim 1, wherein the validation information is received in an option field of an extended DNS request.

9. The method of claim 8, wherein the DNS request is received from a router that is configured to add the validation information to the DNS request.

10. The method of claim 1, further comprising:
    receiving a second DNS request;
    determining whether the second DNS request has a source IP address that matches the predetermined source IP address and a port number that falls within the predetermined port range;
    when the second DNS request has a source IP address that matches the predetermined source IP address and a port number that falls within the predetermined port range, determining whether the second DNS request includes second validation information;
    based on the second validation information, determining whether the second DNS request is a valid DNS request; and
    when the second DNS request is a valid DNS request, processing the second DNS request including sending a DNS response to the source IP address and the port number of the second DNS request.

11. The method of claim 10, wherein the second DNS request and the DNS response are integrity protected using a key value, wherein the key value was previously negotiated with a network.

12. A device comprising:
an interface unit configured to enable network communications;
a memory; and
one or more processors coupled to the interface unit and the memory, and configured to:
receive a domain name system (DNS) request;
determine whether the DNS request has a source IP address that matches a predetermined source IP address and a port number that falls within a predetermined port range;
when the DNS request has a source IP address that matches the predetermined IP source address and a port number that falls within the predetermined port range, determine whether the DNS request includes validation information other than the source IP address and the port number;
based on the validation information, determine whether the DNS request is a valid DNS request; and
drop the DNS request when it determined that the DNS request is not a valid DNS request.

13. The device of claim 12, wherein the one or more processors are further configured to:
receive, from a network that is to become a registered network with the device, a predetermined public IP address as the source IP address, and the port range.

14. The device of claim 12, wherein the validation information includes at least one of a counter value, a first one-time secret, and a timestamp.

15. The device of claim 14, wherein the one or more processors are further configured to:
determine whether the counter value included with the validation information is less than a counter value maintained by the device; and
drop the DNS request if the counter value included with the validation information is less than the counter value maintained by the device.

16. The device of claim 14, wherein the one or more processors, are further configured to:
determine whether the counter value included with the validation information is the same as a counter value maintained by the device or the same as a counter value previously seen by the device; and
drop the DNS request if the counter value included with the validation information is the same as the counter value maintained by the device or the same as a counter value previously seen by the device.

17. The device of claim 14, wherein the one or more processors are further configured to:
determine whether a time value of the timestamp included with the validation information is before a current time value maintained by the device; and
drop the DNS request if the time value of the timestamp included with the validation information is before the current time value maintained by the device.

18. A method comprising:
sending a public Internet Protocol (IP) address and port range that is assigned to a network to a domain name system (DNS) server;
receiving a DNS request from a client device within the network;
adding validation information to the DNS request, wherein the validation information includes a counter; and
sending the DNS request, including the validation information, to the DNS server, wherein the DNS request has the public IP address and a port number within the port range that is assigned to the network.

19. The method of claim 18, wherein the validation information further includes a one-time secret, a key identifier and a timestamp.

20. The method of claim 18, wherein adding validation information to the DNS request comprises adding the validation information in an option field of an extended DNS request.

* * * * *

UNITED STATES PATENT AND TRADEMARK OFFICE
CERTIFICATE OF CORRECTION

Page 1 of 1

PATENT NO.        : 10,284,520 B2
APPLICATION NO.   : 15/422638
DATED             : May 7, 2019
INVENTOR(S)       : K. Tirumaleswar Reddy It is certified that error appears in the above-identified patent and that said Letters Patent is hereby corrected as shown below:

In the Claims

Claim 4, Column 12, Line 14, please replace "is lower less" with --is less--
Claim 4, Column 12, Line 17, please replace "is lower less" with --is less--

Signed and Sealed this
Eighteenth Day of June, 2019

Andrei Iancu
*Director of the United States Patent and Trademark Office*